United States Patent [19]

Fisher

[11] Patent Number: 4,585,200

[45] Date of Patent: Apr. 29, 1986

[54] MOUNTING FOR REMOTELY CONTROLLED REAR-VIEW MIRROR

[75] Inventor: Robert J. Fisher, Livonia, Mich.

[73] Assignee: Magna International Inc., Ontario, Canada

[21] Appl. No.: 342,038

[22] Filed: Jan. 25, 1982

[51] Int. Cl.[4] .............................................. A47G 1/24
[52] U.S. Cl. .................................................... 248/487
[58] Field of Search ............... 248/487, 485, 481, 476, 248/479, 569, 568, 636; 74/501 M; 188/381

[56] References Cited

U.S. PATENT DOCUMENTS

| | | | |
|---|---|---|---|
| 1,988,295 | 1/1935 | Berry | 248/568 |
| 3,077,244 | 2/1963 | Evjen | 188/381 |
| 3,917,212 | 11/1975 | Hadley et al. | 248/487 |
| 3,918,319 | 11/1975 | Mills | 74/491 |
| 3,966,162 | 6/1976 | Hadley | 248/487 |
| 4,250,767 | 2/1981 | Bottrill | 248/487 X |

FOREIGN PATENT DOCUMENTS 2431939  3/1980  France ................................ 248/487

Primary Examiner—J. Franklin Foss
Assistant Examiner—Blair M. Johnson
Attorney, Agent, or Firm—Cushman, Darby & Cushman

[57] ABSTRACT

A cable-controlled rear-view mirror comprises a swivel pin having stub shafts which define a first pivot axis and a semi-cylindrical journal slot which cooperates with a semi-cylindrical trunnion on the glass case to define a perpendicular pivot axis. A modified embodiment further stabilizes the mirror against vibration by creating frictional drag between a spring and a hollow sleeve.

2 Claims, 8 Drawing Figures

MOUNTING FOR REMOTELY CONTROLLED REAR-VIEW MIRROR

BACKGROUND AND SUMMARY OF INVENTION

The present invention relates to improvements in mountings for cable-operated remotely controlled rear-view mirrors capable of pivoting about each of two mutually perpendicular axes. Representative prior art patents showing this general type of mirror mounting system includes U.S. Pat. Nos. 3,917,212, 3,918,319 and 3,966,162.

In mounting systems of this type, the operative relationship of the pivotally interfitting components is maintained by means of the tension applied by the three control cables. That is, the male and female elements of the members which pivot relative to each other are held together in compression by the control cables, rather than being positively retained by fasteners. That structural characteristic makes it desirable to provide a configuration which maximizes the stability of the connection during assembly until such time as the cable tension is established.

It is also desirable in such mirror mounting systems to prevent rotation of the mirror in the mirror's own plane and to provide snug fits between the pivotally cooperating members, to increase the friction or stability of the connections and thereby aid in reduction of vehicle motion-induced vibration of the mirror which interferes with clarity of the reflected image. To that end, it is desirable to maintain close tolerances on the components, while reducing or eliminating costly machining operations. The longitudinal distance from the mirror support pedestal to the mirror itself should be minimized, to reduce cantilever problems and interference between the swinging mirror and the surrounding shell or housing.

In the present invention, these objectives have been accomplished through the use of a swivel pin which has two short axially spaced stub shafts along one axis, and a perpendicularly oriented semi-cylindrical journal slot which cooperates with a semi-cylindrical trunnion on the back of the glass case to establish the second pivot axis. The necessity for machining off flash which commonly occurs at the parting line of cast or injected molded elements has been eliminated by the provision of clearance slots or formations in the opposed cooperating members.

An alternative embodiment additionally provides a resilient mirror stabilizer to establish a frictional drag which substantially reduces high frequency resonance which has been encountered in some vehicle installations.

DETAILED DESCRIPTION OF THE DISCLOSURE

Figure 1:
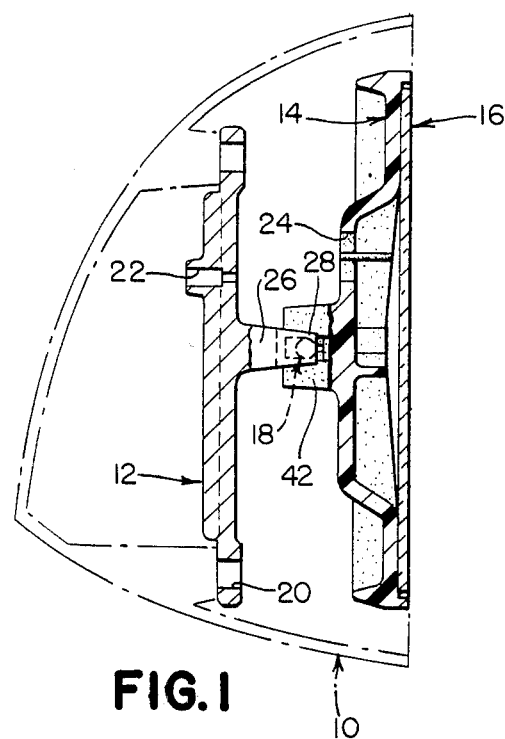
FIG. 1 is a partial side view, in section, taken through the vertical center line of symmetry of the mirror assembly, and showing the mirror housing in phantom.
Figure 2:
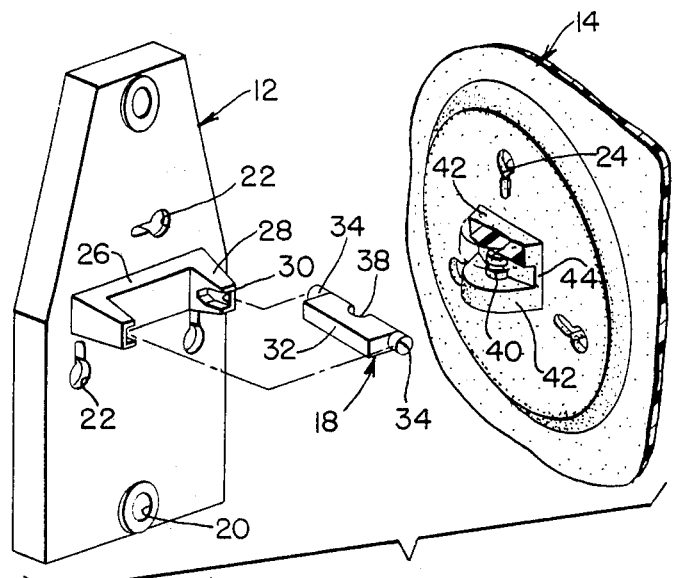
FIG. 2 is an exploded fragmentary perspective view of the mirror mounting system of the present invention.

Referring to FIGS. 1 and 2, in particular, the mirror mounting system of the present invention generally comprises a conventional mirror housing 10 (shown in phantom) which surrounds all but the viewing side of the mirror, a fixed support bracket 12, glass case 14, mirror 16 and swivel pin 18. Glass case 14 is preferably injection molded plastic, such as ABS, while the support bracket 12 and swivel pin 18 are preferably zinc die castings.

Bracket 12 is provided with upper and lower holes 20 to receive mounting screws which secure the mirror assembly to housing 10. Additional keyhole-shaped holes 22 are provided in bracket 12 to permit passage therethrough of conventional Bowden-type tensioned cables (unillustrated), the ends of which are anchored in keyhole-shaped holes 24 in glass case 14. As is conventional, the opposite end of the control cables are connected to a manual control lever, the movement of which is transmitted to the mirror by the cables.

Figure 3:
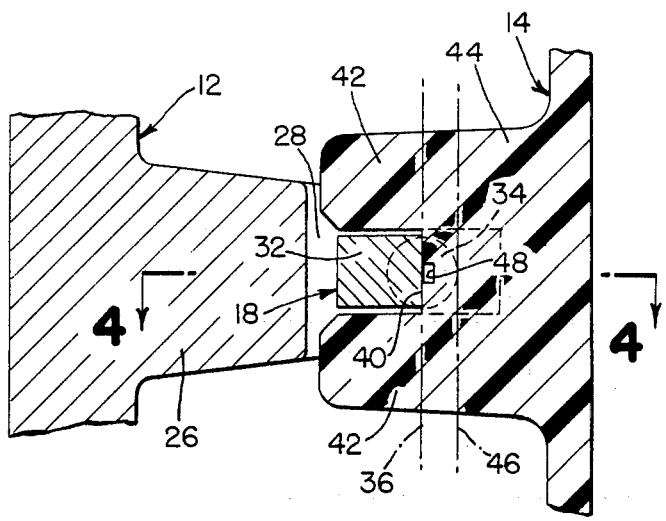
FIG. 3 is a fragmentary side view, on an enlarged scale, of the cooperating pivot elements of the mirror mounting system, viewed in the direction of arrows 3—3 of FIG. 4.
Figure 4:
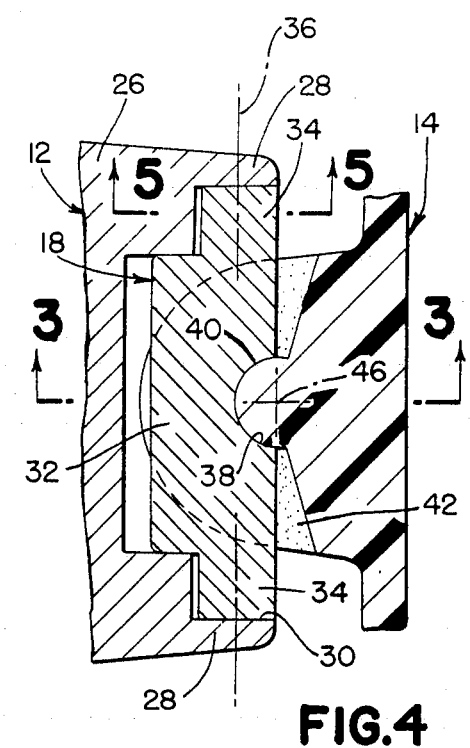
FIG. 4 is a fragmentary sectional plan view of the structure illustrated in FIG. 3, viewed in the direction of arrows 4—4 of FIG. 3.
Figure 5:
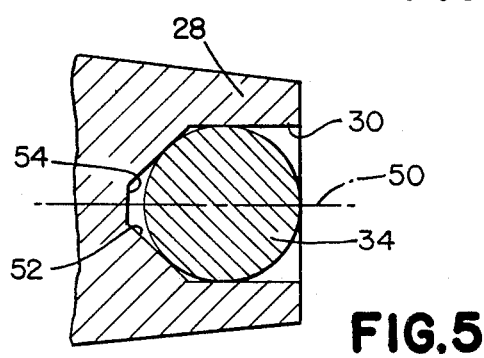
FIG. 5 is a further enlarged fragmentary sectional view in the direction of arrows 5—5 of FIG. 4.

Yoke 26, integrally formed with bracket 12, includes a pair of arms 28 which are provided with journal slots 30 (see FIGS. 2, 4 and 5). Swivel pin 18 comprises a central main body 32 from which extend stub shafts 34 which are pivotally received in slots 30 and which define a horizontal transverse pivot axis 36 shown in FIGS. 3 and 4. Swivel pin 18 further comprises a semi-cylindrical journal slot 38 (see FIGS. 2 and 4) which cooperates with a semicylindrical trunnion 40 on glass case 14 extending vertically between arms 42 of yoke 44 formed integrally with glass case 14 to define vertical pivot axis 46. Trunnion 40 projects forwardly (i.e., to the left in FIG. 4) from the angled adjacent portions of glass case 14 to permit approximately 13 degrees of pivotal movement in each direction about vertical axis 46. Trunnion 40 is provided with an undercut or notch 48 (see FIG. 3) midway along its height, to provide clearance with any flash which may exist at the parting line which occurs along parting line plane 50 (see FIG. 5) of swivel pin 18. That is, it is contemplated that swivel pin 18 would be die cast so that the parting line would be a horizontal plane which also coincides with section line 4—4 of FIG. 3. Therefore, any flash which is formed in journal slot 38 would freely extend into undercut 48, without interference or binding.

Similarly, as shown in FIG. 5, journal slots 30 of yoke arms 28 may be shaped to establish bearing ramps 52 for tangential frictional contact with stub shafts 34. Such configuration leaves base 54 of slot 30 spaced from stub shafts 34, so that any flash which may occur at parting line plane 50 on shafts 34 will be spaced from base 54 to avoid any interference therewith. Alternatively, journal slot 30 may be semi-cylindrical, but additionally provided with a groove or slot in base 54 wide enough to accommodate and clear any flash on stub shafts 34 throughout the approximately 13-degree pivotal movement of pin 18 in each direction about axis 36.

Stub shafts 34 are short to reduce the tendency of long brittle die cast components to fracture under sharp impact loading or during tensioning of the control cables. It will be observed that the deeply recessed configuration of the pivotally cooperating parts, coupled with the close tolerances which can be achieved on die cast or injection molded parts and the friction between closely matched opposed surfaces prevents any significant rotational movement in the plane of the mirror or axial movement in the transverse or vertical directions. The control cables maintain the longitudinal (i.e., fore and aft relative to the vehicle) position of the members. Thus, the novel universal connection provides a highly stable mirror, and simplifies assembly by increasing the tendency of the components to maintain their pre-assembled positions until tensioning of the control cables is completed.

Figure 6:
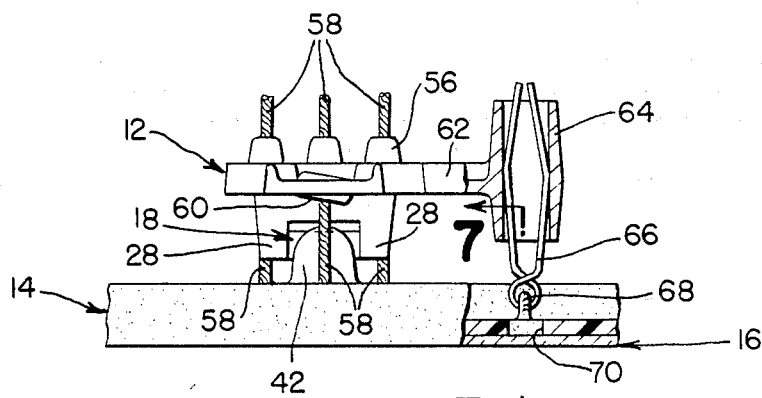
FIG. 6 is a fragmentary plan view, partly in section, of an alternative embodiment of the present invention which incorporates a mirror stabilizing feature.
Figure 7:
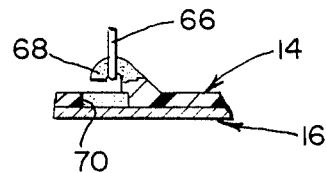
FIG. 7 is a fragmentary side sectional view of the spring anchor arrangement of FIG. 6.
Figure 8:
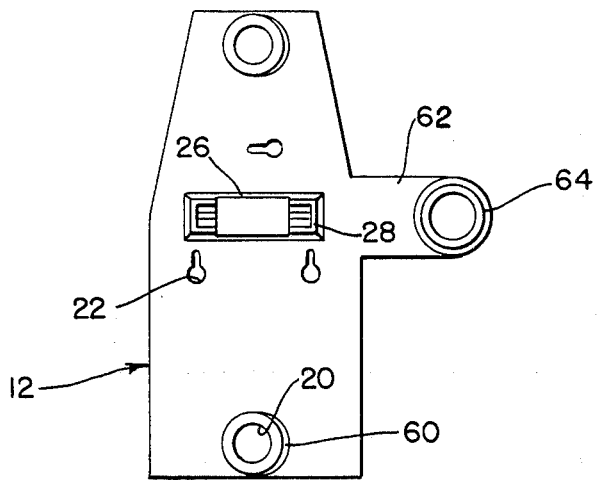
FIG. 8 is a front elevational view of the modified support bracket of FIG. 6.

In some installations of the mirror of the present invention, the vehicle has generated a high frequency resonance, primarily in the horizontal mode, causing an unacceptably unstable reflected image. An alternative embodiment of the present invention provides further stability of the mirror by creating a resilient frictional drag. FIG. 6 is a fragmentary plan view of a modification of the mounting system of FIG. 1 for a left-hand mirror, showing bosses 56 on the front side of support bracket 12, which bosses surround cable passage holes 22 for conventional control cables 58. In this plan view, it can be seen that mounting screw hole bosses 60 are inclined slightly, the direction depending upon whether the mirror is intended for a left-hand or right-hand installation.

The modified features of this embodiment include a stabilizer arm or extension 62 extending laterally from support bracket 12 and terminating in a hollow stabilizer sleeve 64 which receives a stainless steel hairpin type spring 66 the loop of which is anchored to a hook 68 formed in the front face of glass case 14. It is essential that the spring loop be dimensioned to snugly engage hook 68 to prevent relative movement parallel to the axis of sleeve 64. The non-parallel arrangement of the legs of spring 66 assure clearance with the ends of sleeve 64 during pivotal movement about vertical axis 46. A small opening 70 is provided in glass case 14 adjacent hook 68 to permit access of the cooperating die formations.

The spring has been designed so that its radially outward resilient force against the sleeve walls generates approximately 2/10ths of a pound of longitudinal or axial drag along the interior surface of stabilizer sleeve 64, which drag has been found to be sufficient to reduce the high frequency resonance to a satisfactory level to stabilize the mirror image.

This invention may be further developed within the scope of the following claims. Accordingly, the above specification is to be interpreted as illustrative of only two operative embodiments of the present invention, rather than in a strictly limited sense.

I now claim:

1. In a remotely controlled rear-view mirror of the type mounted for pivotal movement about each of two mutually perpendicular axes under the influence of a remotely positioned manual control lever and a system of tensioned control cables which also hold the interfitting mirror pivot elements in compression, and including a fixed support member adapted to be fixedly secured to a portion of a vehicle and a mirror support member adapted to have a mirror affixed thereto and to be pivotally mounted to the fixed support member for pivotal movement by the control lever and control cables the ends of which are anchored to the mirror support member, an improvement for suppressing vibration of the mirror and mirror support member which comprises:

a hollow sleeve formed in one of said fixed support member and mirror support member, the axis of which sleeve extends in a direction substantially parallel to the axes of the control cables at their point of connection to the mirror support member, and spring means secured to the other of said fixed support member and mirror support member in a manner to normally prevent any relative movement between said spring means and said other member in a direction parallel to said sleeve axis, said spring means generating resilient forces perpendicular to and against the interior surface of said sleeve, said sleeve axis being substantially displaced from at least one of said pivot system axes, thereby to create frictional drag forces in the direction of said sleeve axis which resist longitudinal movement of said spring along the axis of said sleeve.

2. In a remotely controlled rear-view mirror of the type mounted for pivotal movement about each of two mutually perpendicular axes under the influence of a remotely positioned manual control lever and a system of tension control cables which also hold the interfitting mirror pivot elements in compression, the improved pivot mounting system comprising:

a fixed support member having a pair of coaxial journal slots longitudinally spaced along the axis thereof, said journal slots being open along one longitudinal side thereof;

a swivel pin having a central body portion and a pair of coaxial stub shafts on opposite ends of said central body, said stub shafts and said journal slots dimensioned to establish a first pivot system by which said swivel pin can pivot about the common axis of said stub shafts and journal slots when said stub shafts are inserted in said journal slots from said open side of said slots;

said swivel pin further having a journal slot located in its central body portion between said stub shafts and oriented so that the axis of said swivel pin journaled slot is perpendicular to the axis of said stub shafts and so that said journal slot is open along one longitudinal side thereof which opens in the same direction as do the journal slots of said fixed support members;

a universally mounted mirror support member adapted to have a mirror fixed thereto, said mirror support member having a semi-cylindrical trunnion dimensioned to cooperate with said swivel pin journal slot to establish a second pivot system about the axis common thereto when said trunnion is positioned in said journal slot, said mirror support member being further provided with means for receiving and anchoring the ends of said control cables;

said trunnion extending vertically between two yoke arms formed in said mirror support member, said yoke arms projecting towards said fixed support member above and below said swivel pin a distance at least as great as the dimension of said swivel pin in the direction of said projection so that said trunnion and yoke snugly confine said swivel pin in all directions except the direction toward said fixed support member, while permitting relative pivotal movement between said swivel pin and mirror support member;

a vibration damping system comprising a hollow sleeve formed in one of said fixed support member and mirror support member, the axis of which sleeve extends in a direction substantially parallel to the axes of the control cables at their point of connection to the mirror support member, and spring means secured to the other of said fixed support member and mirror support member in a manner to normally prevent any relative movement between said springs and said other member in a direction parallel to said sleeve axis, said spring means generating resilient forces perpendicular to and against the interior surface of said sleeve, said sleeve axis being substantially displaced from at least one of said pivot system axes, thereby to create frictional drag forces in the direction of said sleeve axis which resist longitudinal movement of said spring along the axis of said sleeve;

whereby a compression pivot system is established by which the tension of the control cables pulls said mirror support member towards said fixed support member, thereby retaining said swivel pin in compression therebetween to maintain said first and second pivot systems in operable assembled relationship.

* * * * *